United States Patent [19]

Wallis

[11] Patent Number: 5,314,172
[45] Date of Patent: May 24, 1994

[54] HIGH PRESSURE DIE CYLINDER AND MANIFOLD SYSTEM

[76] Inventor: Bernard J. Wallis, 2215 Dacosta, Dearborn, Mich. 48128

[21] Appl. No.: 880,952

[22] Filed: May 8, 1992

[51] Int. Cl.⁵ .............................................. F16F 9/02
[52] U.S. Cl. ................... 267/119; 267/130; 92/80; 92/82; 92/112; 92/160; 184/24; 277/63; 277/69
[58] Field of Search .............. 267/75, 118, 119, 129, 267/130, 200; 188/286, 287; 92/80, 82, 87, 112, 160; 184/24, 34; 277/63, 69, 59, 74–75

[56] References Cited

U.S. PATENT DOCUMENTS

| | | | |
|---|---|---|---|
| 1,768,633 | 7/1930 | Ries | 92/112 |
| 2,364,823 | 12/1944 | Schnell | 277/74 X |
| 3,947,005 | 3/1976 | Wallis | 267/119 |
| 4,005,763 | 2/1977 | Wallis | 184/24 |
| 4,044,859 | 8/1977 | Wallis | 184/18 |
| 4,076,103 | 2/1978 | Wallis | 267/119 X |
| 4,154,434 | 5/1979 | Wallis | 184/24 X |
| 4,342,448 | 8/1982 | Wallis | 267/119 |
| 4,529,181 | 4/1985 | Wallis | 267/119 |
| 4,572,489 | 2/1986 | Wallis | 267/119 |
| 4,583,722 | 4/1986 | Wallis | 267/119 |
| 4,628,796 | 12/1986 | Wallis | 267/130 X |
| 4,741,518 | 4/1988 | Wallis | 267/75 |
| 5,086,691 | 2/1992 | von Hatten | 184/24 X |
| 5,172,892 | 12/1992 | Wallis | 267/119 |

FOREIGN PATENT DOCUMENTS 0194385  3/1923  United Kingdom ................. 277/69

Primary Examiner—Robert J. Oberleitner
Assistant Examiner—Josie A. Ballato
Attorney, Agent, or Firm—Barnes, Kisselle, Raisch, Choate, Whittemore & Hulbert

[57] ABSTRACT

A high pressure die cylinder and manifold system including a plurality of die cylinders mounted on a manifold. Each die cylinder includes a cylinder body in which a piston rod and a piston is positioned for limited relative movement with respect to the cylinder body. A cup shaped piston sealing ring is mounted on the cylinder body for engagement with the piston rod and a cup shaped sealing ring is mounted on the piston for engagement with the cylinder body. A lubricant metering ring is mounted on the piston intermediate the sealing rings and the piston has a lubricant chamber that communicates with circumferentially spaced openings in the lubricant metering ring for delivering lubricant to the exterior of the sealing ring. The cylinder body is provided with a radial annular flange, a cylindrical pilot surface and a portion below the pilot surface of the cylinder body is threaded by interengaging threads with an opening in the manifold so that the lower end of the gas cylinder communicates with high pressure gas within the manifold. The manifold is provided with an annular seat surrounding the opening into which the gas cylinder extends and a U-shaped cup manifold sealing ring is provided in the seat and held into position by engagement of the radial flange and a pilot surface on the cylinder body with the manifold.

9 Claims, 3 Drawing Sheets

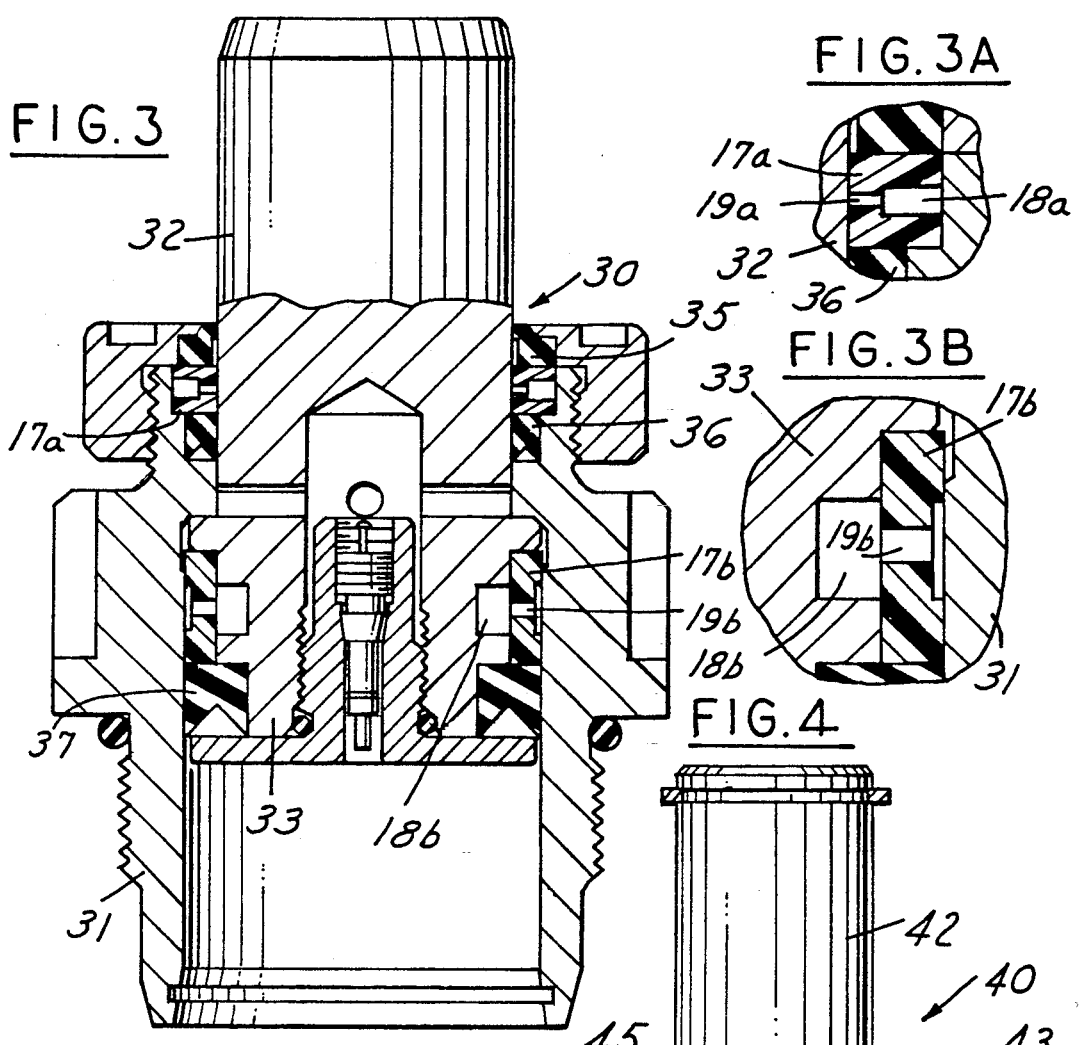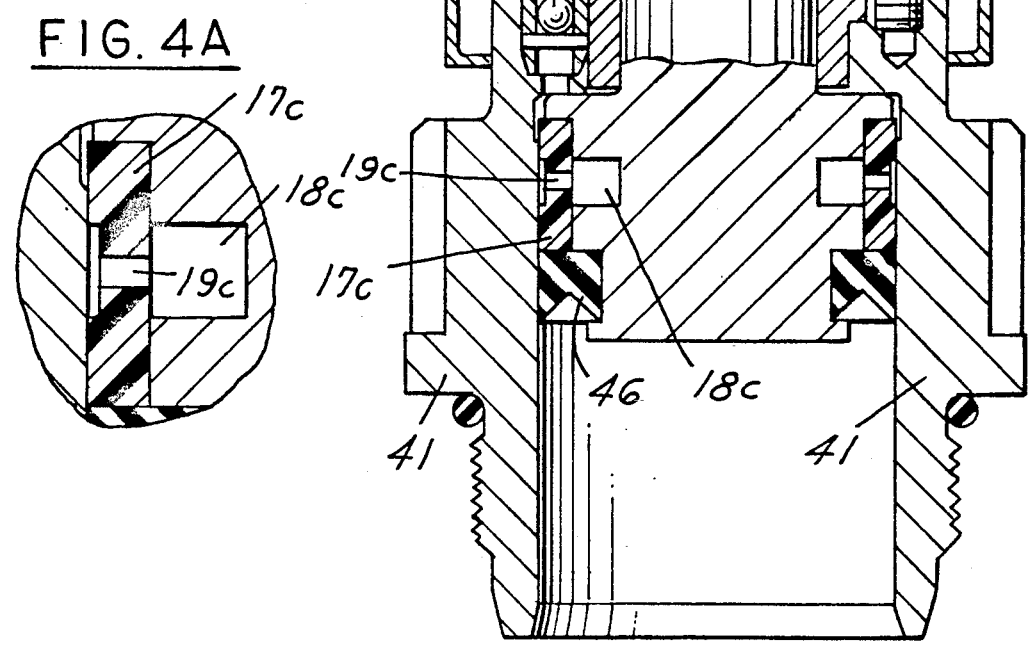

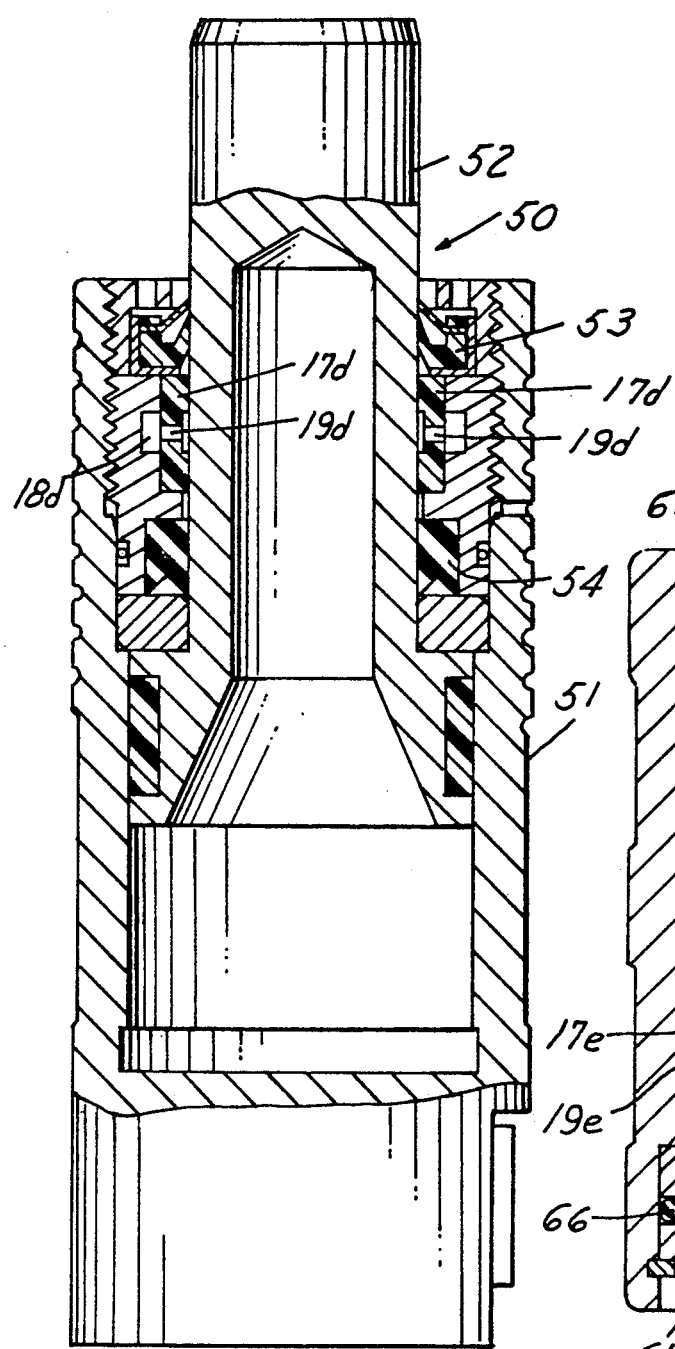
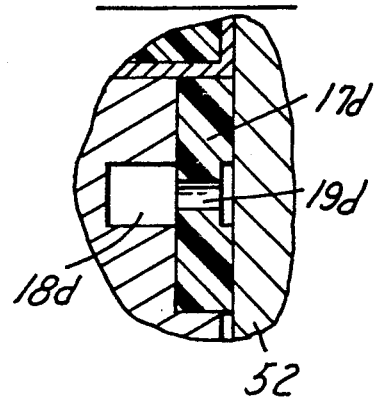
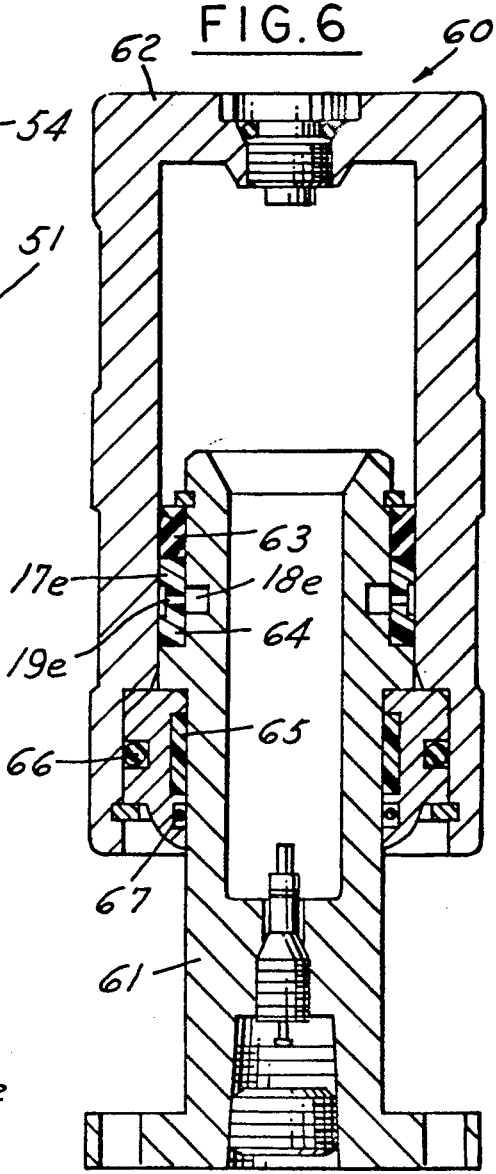
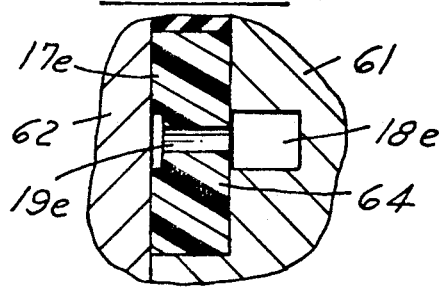

HIGH PRESSURE DIE CYLINDER AND MANIFOLD SYSTEM

This invention relates to die cylinder and manifold systems and particularly such a system which function at higher pressures than have been commonly used.

BACKGROUND AND SUMMARY OF THE INVENTION

In die stamping and the like wherein a pair of spaced apart die members are mounted for relative movement toward and away from one another to form a workpiece between the dies, it is common to provide a die cylinder and manifold system which includes a plurality of die cylinders having piston rods that function to yieldingly resist movement of the die members.

Such systems are shown, for example, in U.S. Pat. Nos. 3,947,005, 4,044,859, 4,342,448, 4,529,181, 4,583,722 and 4,628,796.

Such systems have been utilized at relatively high gaseous pressures up to about 1000 p.s.i.

Among the objectives of the present invention are to provide a die cylinder and manifold system which will function higher pressures on the order of 2000 p.s.i.; which at relatively higher pressures on the order of 2000 p.s.i. ; which will be effective for a long periods of time without leakage; which include a novel lubricating system; which does not require any parts that are more expensive than have been used for systems that function at lower pressures; and to provide a lubricating system for die cylinders which are used in a manifold system or are self-contained.

In accordance with the invention, a high pressure die cylinder and manifold system comprising a plurality of die cylinders mounted on manifold. Each die cylinder includes a cylinder body in which a piston rod is positioned for limited relative movement with respect to the cylinder body. A cup shaped piston sealing ring is mounted on the cylinder body for engagement with the piston rod and a cup shaped sealing ring is mounted on the piston for engagement with the cylinder body. A lubricant metering ring is mounted on the piston intermediate the sealing rings and the piston has a lubricant chamber that communicates with circumferentially spaced openings in the lubricant metering ring for delivering lubricant to the exterior of the metering ring. The cylinder body is provided with a radial annular flange, a cylindrical pilot surface and a portion below said pilot surface of the cylinder body is threaded by interengaging threads with an opening in the manifold so that the lower end of the gas cylinder communicates with high pressure gas within the manifold. The manifold is provided with an annular seat surrounding the opening into which the gas cylinder extends and a U-shaped cup manifold sealing ring is provided in the shoulder and held into position by engagement of the radial flange and a pilot surface on the cylinder body with the manifold.

The above described die cylinder includes a novel lubricating system which can also be used in die cylinders that are used in a manifold system or are self-contained.

DESCRIPTION OF THE DRAWINGS

FIG. 3 is a sectional view showing the lubricating system applied to another form of die cylinder.

FIGS. 3A and 3B are sectional views of portions of the die cylinder shown in FIG. 3.

FIG. 4 is a sectional view showing the lubricating system applied to a further form of die cylinder.

FIG. 4A is a sectional view of a portion of the die cylinder shown in FIG. 4.

FIG. 5 is a sectional view showing the lubricating system in a self-contained die cylinder.

FIG. 5A is a fragmentary sectional view of a portion of the die cylinder shown in FIG. 5.

FIG. 6 is a sectional view of the lubricating system applied to another self-contained die cylinder.

FIG. 6A is a fragmentary sectional view of a portion of the die cylinder shown in FIG. 6.

DESCRIPTION

Figure 1:
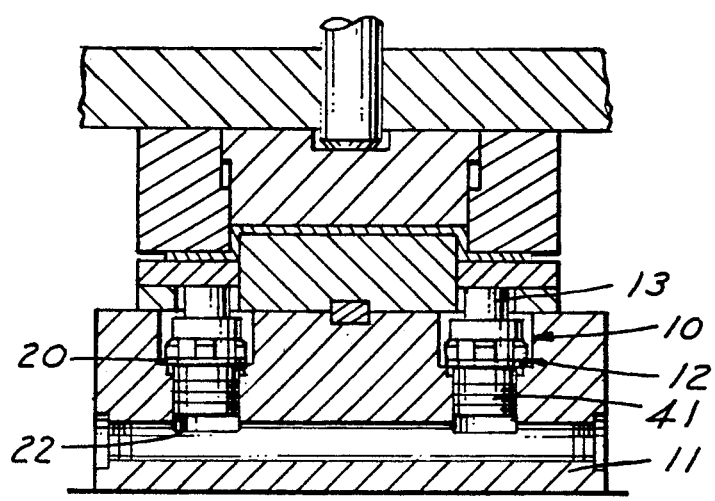
FIG. 1 is a sectional view of a high pressure die cylinder and manifold system embodying the invention.
Figure 2:
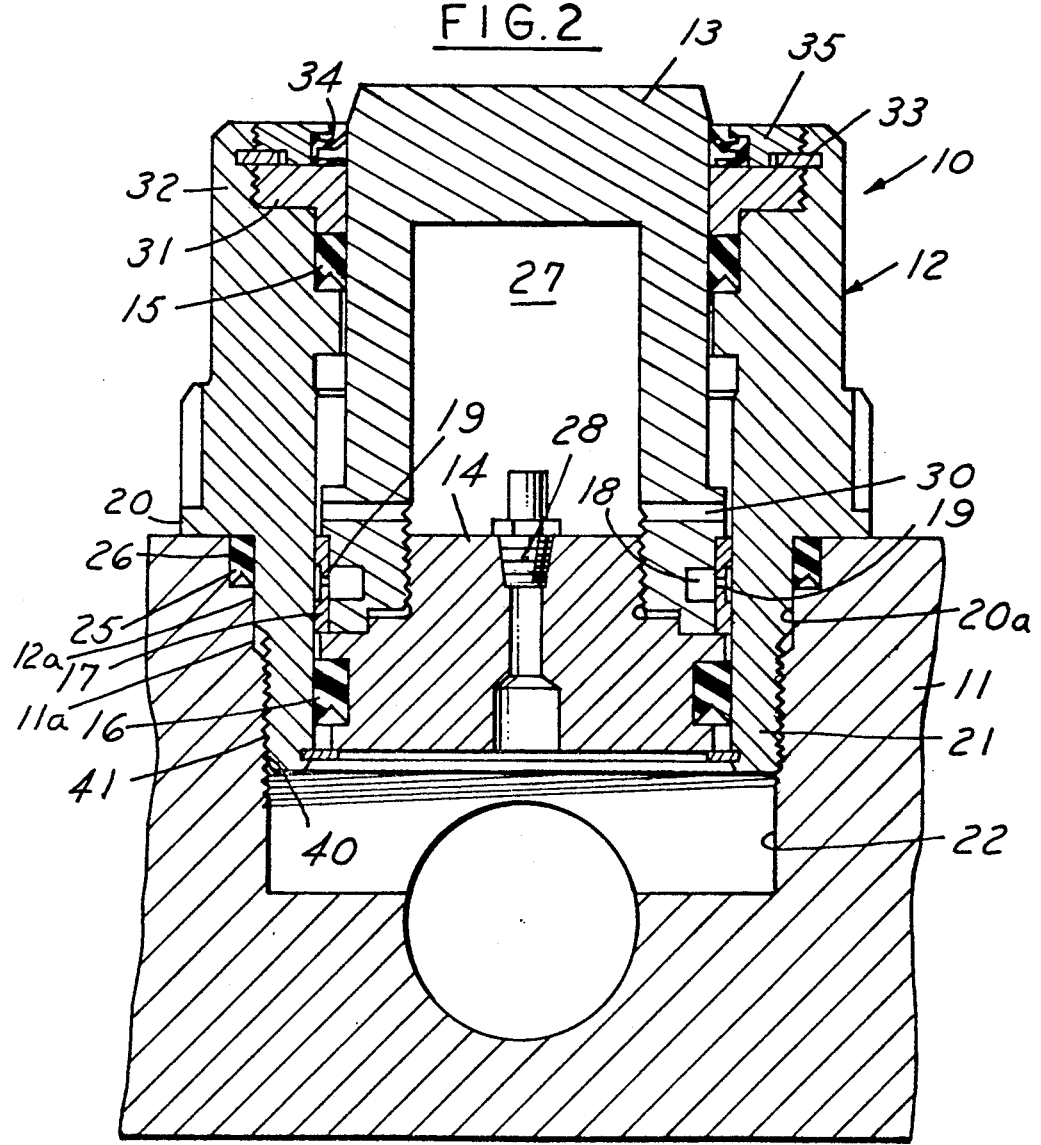
FIG. 2 is a vertical sectional view of a die cylinder used in the system.

Referring to FIGS. 1 and 2, the high pressure die cylinder and manifold system embodying the invention comprises plurality of die cylinders 10 mounted on a manifold 11. Each a die cylinder 10 includes a cylinder body 12 in which a piston rod 13 is positioned for relative movement. The piston rod 13 has a piston 14 and is mounted for limited axial movement relative to the cylinder body 12. A cup shaped piston sealing ring 15 is mounted on the body 12 for engagement with the piston rod 13 and a cup shaped sealing ring 16 is mounted on the piston 14 for engagement with the cylinder body 12. A combined bearing member and lubricant metering ring 17 is mounted on the piston 14 intermediate the sealing rings 15, 16 and the piston 14 has a lubricant chamber 18 that holds lubricant such as grease. The chamber 18 communicates with circumferentially spaced openings 19 in the grease metering ring 17 for delivering grease to the exterior of the metering ring 17.

The cylinder body 12 is provided with a radial annular flange 20. The body 12 is also provided with a cylindrical pilot surface 12a below the flange 20 which engages a cylindrical surface 11a on the manifold 11. A portion 21 of the cylinder body is threaded by interengaging fine threads with an opening 22 in the manifold 11 so that the lower end of the die cylinder 10 communicates with high pressure gas within the manifold. The manifold 11 is provided with an annular seat 25 surrounding the opening into which the gas cylinder extends and a U-shaped cup manifold sealing ring 26 is provided in the seat and held into position by engagement of the radial flange 20 on the cylinder body 12 with the upper surface of the manifold.

As shown more specifically in FIGS. 1 and 2, the piston 14 comprises an end plug that defines the piston and is threaded into the lower end of the piston rod 13. The piston rod 13 includes a chamber 27 that is normally not pressurized and an one-way valve 28 is threaded into the piston 14 and functions to relieve any excess pressure from the manifold into the chamber.

Radial openings 30 in the piston rod provide additional space for the excessive pressure to pass between the piston rod 13 and the cylinder body 12.

The upper sealing ring 15 is held in position by a retaining ring 31 that is threaded into an annular shoulder 32 on the cylinder body and held therein by a snap ring 33. A wiper 34 seal is provided on the upper end of the retaining ring and is held in position by a wiper retaining ring 35 that is threaded into the same threads in the cylinder body.

Further, in accordance with the invention, the lower end of the cylinder body is provided with fine threads 40 that engage fine threads 41 in an opening in the manifold.

It has been found that the aforementioned arrangement including fine threads 40, 41 having a 16 pitch and a U-shaped seal 16 provides a long lasting seal which is effective for high pressure on the order of 2000 p.s.i. This may be contrasted to the normal threads having a 12 pitch and use of O-rings that have been common and well known in die cylinders and as shown in the aforementioned patents showing the die cylinder and manifold systems.

The lubricating system shown in FIG. 1 can also be applied to other die cylinders used in a manifold system or in self-contained die systems.

Referring to FIGS. 3, 3A and 3B, there is shown a die cylinder used in a manifold system and incorporating the novel lubricating system. The die cylinder 30 is similar to that shown U.S. Pat. No. 4,342,448, incorporated herein by reference, and comprises a cylinder body 31 that is threaded into a manifold, and a piston 32 having an enlarged lower end 33. Seals 35, 36 on the body are separated by a combined bearing member and lubricating metering ring 17a having a lubricant chamber 18a and passages 19a, like those shown in FIG. 2. The die cylinder 30 further includes a sealing ring 37 on the enlarged end 33 and a combined bearing ring and lubricant metering ring 17b thereon with associated chamber 18b and openings 19b.

The form of the die cylinder 40 shown in FIGS. 4, 4A is similar to that shown in U.S. Pat. No. 4,572,489, incorporated herein by reference and comprises a cylinder body 41, a piston 42, threaded end cap 43, and ball check 45, a seal 46 and combined bearing member and lubricating metering ring 17c, and associated lubricant chamber 18c, and openings 19c.

In FIGS. 5 and 5A, the lubricating system is shown as applied to a self-contained die cylinder 50 such as shown in U.S. Pat. No. 4,741,518 incorporated herein by reference. Cylinder 50 includes a cylinder body 51, a piston 52 and upper and lower seals 53, 54 on the cylinder body 51. A combined bearing member and lubricating metering ring 17d is provided between seals 53, 54 and has associated lubricant chamber 18d and openings 19d.

In the form of self-contained die cylinder 60 shown in FIGS. 6, 6A, the die cylinder 61 is of the type shown in U.S. patent application Ser. No. 07/715,594 filed Jun. 14, 1991, which is a continuation-in-part of Ser. No. 627,699, filed Dec. 14, 1990 and issued as U.S. Pat. No. 5,197,718 incorporated herein by reference. The die cylinder 60 includes a piston 61, cylinder 62 and upper and lower seals 63, 64 on the piston 61. A combined bearing member and lubricating metering ring 17e is interposed between the seals 63, 64 and includes associated lubricant chamber 18e and radial openings 19e. The die cylinder further includes a lower bearing member 65 and seals 66, 67.

It can thus be seen that there has been provided a die cylinder and manifold system which will function at relatively higher pressures on the order of 2000 p.s.i.; which will be effective for a long periods of time without leakage; which include a novel lubricating system; which does not require any parts that are more expensive than have been used for systems that function at lower pressures; and to provide a lubricating system for die cylinders which are used in a manifold system or are self-contained.

I claim:

1. A die cylinder comprising
   a cylinder containing gas under pressure,
   a piston movable relative to said cylinder and urged outwardly by gaseous pressure outwardly relative to said cylinder,
   sealing means between said piston and said cylinder,
   a combined bearing member and lubricating metering ring on one of said cylinder and said piston and engaging the other of said cylinder and piston,
   a closed lubricant chamber associated with said combined bearing member and lubricating ring,
   said combined bearing member and lubricating ring having circumferentially spaced radial openings through said bearing member and lubricating ring for delivering lubricant from said chamber to the exterior of said combined bearing member and lubricating ring as the piston is reciprocated in said cylinder.

2. The die cylinder set forth in claim 1 wherein said combined bearing member and lubricating ring and chamber is on said piston.

3. The die cylinder set forth in claim 1 wherein said cylinder has a closed end and an open end and a sleeve in said open end, and said combined bearing member and lubricating ring are on said sleeve of said cylinder, said ring having said radial openings of said lubricating ring directing said lubricant from said chamber to a surface of said ring adjacent said piston.

4. The die cylinder set forth in any one of claims 1-3 wherein said die cylinder includes an opening adapted to provide communication to a pressurized manifold.

5. The die cylinder set forth in any one of claims 1-3 wherein the die cylinder is self-contained.

6. A high pressure die cylinder and manifold system comprising
   a plurality of gas filled die cylinders mounted on a manifold,
   each die cylinder including a cylinder body in which a piston rod is positioned for relative movement,
   a piston sealing ring mounted on the body for engagement with the piston rod,
   sealing ring means mounted on the piston for engagement with the cylinder body,
   said cylinder body being provided with a radial annular shoulder,
   said cylinderal body having a flange and a pilot surface below said flange engaging a complementary cylindrical surface on a manifold opening,
   a portion of the cylinder body below said pilot surface being threaded by interengaging threads with said opening in the manifold so that the lower end of the gas cylinder communicates with high pressure gas within the manifold,
   said manifold being provided with an annular seat surrounding the opening into which the gas cylinder extends, and
   a manifold sealing ring being provided in the annular seat and held into position by engagement of the radial flange on the cylinder body with the upper surface of the manifold.

7. The high pressure die cylinder and manifold system set forth in claim 6 wherein said sealing ring means and sealing rings comprise cup sealing rings.

8. The high pressure die cylinder and manifold system set forth in claim 6 including lubricating means within said cylinder for lubricating said piston.

9. The high pressure die cylinder and manifold system set forth in claim 8 wherein said lubricating means comprises a lubricant bearing and metering ring mounted on the piston intermediate the sealing rings having circumferentially spaced radial openings, said piston having a closed lubricant chamber that communicates with said circumferentially spaced radial openings in the lubricant metering ring for delivering lubricant to the exterior of the sealing ring.

* * * * *